United States Patent
Mackenzie

(10) Patent No.: US 11,470,533 B2
(45) Date of Patent: Oct. 11, 2022

(54) HANDOVER FROM A MOVING BASE STATION

(71) Applicant: British Telecommunications Public Limited Company, London (GB)

(72) Inventor: Richard Mackenzie, London (GB)

(73) Assignee: British Telecommunications Public Limited Company, London (GB)

(*) Notice: Subject to any disclaimer, the term of this patent is extended or adjusted under 35 U.S.C. 154(b) by 0 days.

(21) Appl. No.: 15/733,520

(22) PCT Filed: Jan. 11, 2019

(86) PCT No.: PCT/EP2019/050677
§ 371 (c)(1),
(2) Date: Aug. 19, 2020

(87) PCT Pub. No.: WO2019/161989
PCT Pub. Date: Aug. 29, 2019

(65) Prior Publication Data
US 2020/0389831 A1    Dec. 10, 2020

(30) Foreign Application Priority Data
Feb. 21, 2018  (EP) .................................... 18157844

(51) Int. Cl.
*H04W 36/32* (2009.01)
*H04W 36/08* (2009.01)
(Continued)

(52) U.S. Cl.
CPC .......... *H04W 36/32* (2013.01); *H04W 36/08* (2013.01); *H04W 64/006* (2013.01); *H04W 16/32* (2013.01); *H04W 84/005* (2013.01)

(58) Field of Classification Search
CPC .... H04W 36/08; H04W 36/32; H04W 64/006
(Continued)

(56) References Cited

U.S. PATENT DOCUMENTS 10,285,121 B2 * 5/2019 Karlsson ............. H04W 40/005
2013/0084884 A1   4/2013 Teyeb et al.
(Continued)

FOREIGN PATENT DOCUMENTS

EP        2947915 A1    11/2015

OTHER PUBLICATIONS

3GPP TS 36.423, Third Generation Partnership Project; Technical Specification Group Radio Access Network; Evolved Universal Terrestrial Radio Access Network (E-UTRAN); X2 application protocol(X2AP), Technical Specification, pp. 1-250.
(Continued)

*Primary Examiner* — Joel Ajayi
(74) *Attorney, Agent, or Firm* — Patterson Thuente IP

(57) ABSTRACT

This disclosure provides a method in a cellular telecommunications network having a first base station and a second base station, wherein the first base station is moving relative to a reference object and serves a User Equipment (UE) the method including identifying the UE's relative speed with respect to the reference object; preparing a message to transfer the UE to the second base station, the message including one or more information elements to indicate the UE's relative speed to the reference object, wherein a mobility state for the UE may be estimated from the one or more information elements indicating the UE's relative speed with respect to the reference object; and initiating a transfer of the UE from the first base station to the second base station by sending the message to the second base station, wherein the message includes the one or more information elements to indicate the UE's relative speed with respect to the reference object.

6 Claims, 7 Drawing Sheets

(51) Int. Cl.
*H04W 64/00* (2009.01)
*H04W 16/32* (2009.01)
*H04W 84/00* (2009.01)

(58) Field of Classification Search
USPC .................................................. 455/436–448
See application file for complete search history.

(56) References Cited

U.S. PATENT DOCUMENTS

| 2013/0115949 | A1* | 5/2013 | Centonza ............ H04W 36/245 |
| | | | 455/436 |
| 2015/0181480 | A1 | 6/2015 | Bulakci et al. |
| 2015/0319775 | A1* | 11/2015 | Takeda .................... H04L 25/00 |
| | | | 370/329 |
| 2017/0105172 | A1 | 4/2017 | Wilhelmsson et al. |
| 2018/0007584 | A1 | 1/2018 | Kwon et al. |
| 2018/0191416 | A1* | 7/2018 | Palenius ................. G01S 11/10 |

OTHER PUBLICATIONS

Combined search and Examination Report for Great Britain Application No. 2014167.7, dated Nov. 12, 2020, 3 pages.
Extended European Search Report for Application No. 21165875.2, dated May 14, 2021, 9 pages.
International Search Report and Written Opinion for International Application No. PCT/EP2019/050677 dated Feb. 19, 2019, 16 pages.
Communication pursuant to Article 94(3) EPC for Application No. 19700384.1, dated Jul. 7, 2021, 7 pages.

* cited by examiner

# HANDOVER FROM A MOVING BASE STATION

TECHNICAL FIELD

The present disclosure relates to a method in a cellular telecommunications network. In particular, it relates to a method of determining a mobility state estimate of a User Equipment (UE) in a cellular telecommunications network.

BACKGROUND

A cellular telecommunications network comprises a plurality of base stations which each have a coverage area. User Equipment (UE) are typically mobile and travel within and in between the coverage areas of the plurality of base stations. The cellular telecommunications network provides several processes, known as cell reselection and handover, to allow UEs to move from the coverage area of one base station to the coverage area of another base station without losing service.

One parameter in cellular telecommunications networks is the UE's speed (or an estimate thereof), which in the Long Term Evolution (LTE) protocol is known as the 'mobility state estimate'. When a UE is in connected mode, the serving base station estimates this parameter for a UE in order to classify the UE into one of three mobility states (e.g. "normal", "fast" or "very fast"), based upon which the base station configures several mobility related parameters (e.g. measurement reporting triggers) for the UE.

When a UE first connects to a base station in the cellular telecommunications network (e.g. after power-up), the base station will classify the UE as having a "normal" mobility state estimate and will use the associated mobility related parameters. Thereafter, the UE will be transferred between base stations as it moves between their respective coverage areas. Following several such handovers, a base station will more accurately estimate the UE's mobility state based on information contained in a handover request message. The handover request message from the serving base station to the target base station includes a "UE History" field indicating, for the last [[16]] serving base stations for that UE including the current serving base station: an identifier for each serving base station, the time the UE stayed in the coverage area of each of those serving base stations, and an approximate size of each coverage area of those serving base stations. The target base station may then estimate the UE's mobility state from this historical information.

Modern cellular telecommunications networks also use mobile base stations, in which the base stations are movable either through self-powered movement or by being fixed to a moving vehicle (such as a train or car). They are particularly useful in areas where there are sudden increases in demand and/or where fixed infrastructure is difficult or expensive to deploy. When a UE is connected to a mobile base station, it may be correctly identified as having the "normal" mobility state estimate if it is moving at the same or similar speed with respect to the mobile base station's frame of reference. However, if the mobile base station and UE are both moving relatively quickly with respect to a non-mobile base station's frame of reference, then a problem arises if the non-mobile base station is the target base station in a handover from the mobile base station. That is, if the UE History information indicates that the UE has been inside the mobile base station's coverage area for a long time, then the target base station will classify the UE into the "normal" mobility state estimate and set its mobility related parameters (e.g. measurement reporting triggers) based on that estimate. However, if the UE and serving base station are both mobile and moving relatively fast to the target base station's frame of reference, such that the UE would more correctly described as "fast" or "very fast" relative to the target base station's frame of reference, then these mobility related parameters will be inappropriate. The UE will then experience poor Quality of Service (QoS).

It is therefore desirable to alleviate some or all of the above problems. In particular, it is desirable for the UE's mobility state estimate to be correctly classified following a transfer from a mobile serving base station to a target base station.

SUMMARY

According to a first aspect of the disclosure, there is provided a method in a cellular telecommunications network having a first base station and a second base station, wherein the first base station is moving relative to a reference object and serves a User Equipment, UE, the method comprising identifying the UE's relative speed with respect to the reference object; preparing a message to transfer the UE to the second base station, the message including one or more information elements to indicate the UE's relative speed to the reference object, wherein a mobility state for the UE may be estimated from the one or more information elements indicating the UE's relative speed with respect to the reference object; and initiating a transfer of the UE from the first base station to the second base station by sending the message to the second base station, wherein the message includes the one or more information elements to indicate the UE's relative speed with respect to the reference object. The reference object may be stationary (e.g. the Earth).

The transfer may be one of a group comprising: a handover, and a cell reselection.

The one or more information elements may include a first information element representing a size of the serving base station's coverage area and a second information element representing a time the UE has been positioned within the first base station's coverage area, wherein a value for the time may be modified based on the UE's relative speed with respect to the reference object.

The first base station may be connectable to a core networking entity via a donor connection to a donor base station, and the one or more information elements may include a first information element representing a size of the donor base station's coverage area and a second information element representing a time the donor base station has acted as a donor for the first base station.

The UE's relative movement to the first base station may be such that the UE would have been positioned within the coverage area of the first base station for less time had the first base station been stationary relative to the reference object, and the time value may be reduced.

The UE's relative movement to the first base station may be such that the UE would have been positioned within the coverage area of the first base station for more time had the first base station been stationary relative to the reference object, and the time value may be increased.

The method may further comprise the second base station estimating the mobility state of the UE based upon the one or more information elements to indicate the UE's relative speed with respect to the reference object.

According to a second aspect of the disclosure, there is provided a computer program product comprising instructions which, when the program is executed by a computer, cause the computer to carry out the method of the first aspect of the disclosure. The computer program may be stored on a computer readable data-carrier.

According to a third aspect of the disclosure, there is provided a network node for a cellular telecommunications network, the cellular telecommunications network including a base station being adapted for moving relative to a reference object and to serve a User Equipment (UE) wherein the network node comprises a memory and a processor, the processor configured to implement the method of the first aspect of the disclosure, wherein the network node is the first base station or the UE.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
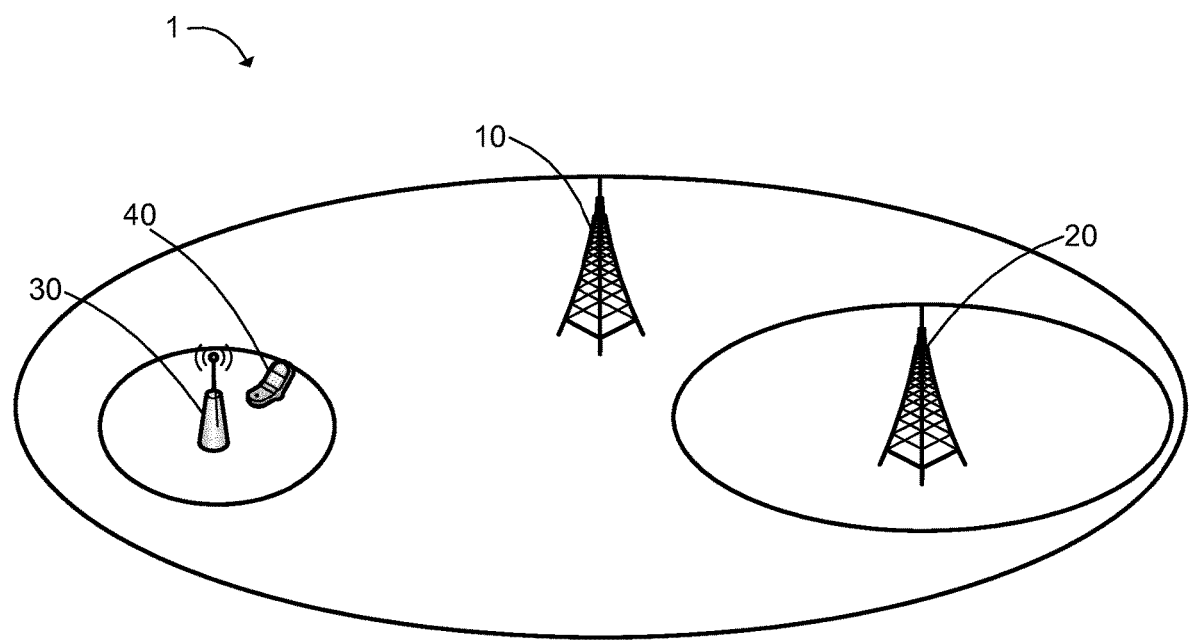
FIG. 1 is a schematic diagram of a first embodiment of a cellular telecommunications network of the present disclosure.

A first embodiment of a cellular telecommunications network 1 of the present disclosure will now be described with reference to FIGS. 1 to 3. The cellular telecommunications network 1 includes a first and second terrestrial base station 10, 20, and a mobile base station 30. In this embodiment, the mobile base station 30 is an Unmanned Aerial Vehicle (UAV), and it serves a User Equipment (UE) 40.

Figure 2:
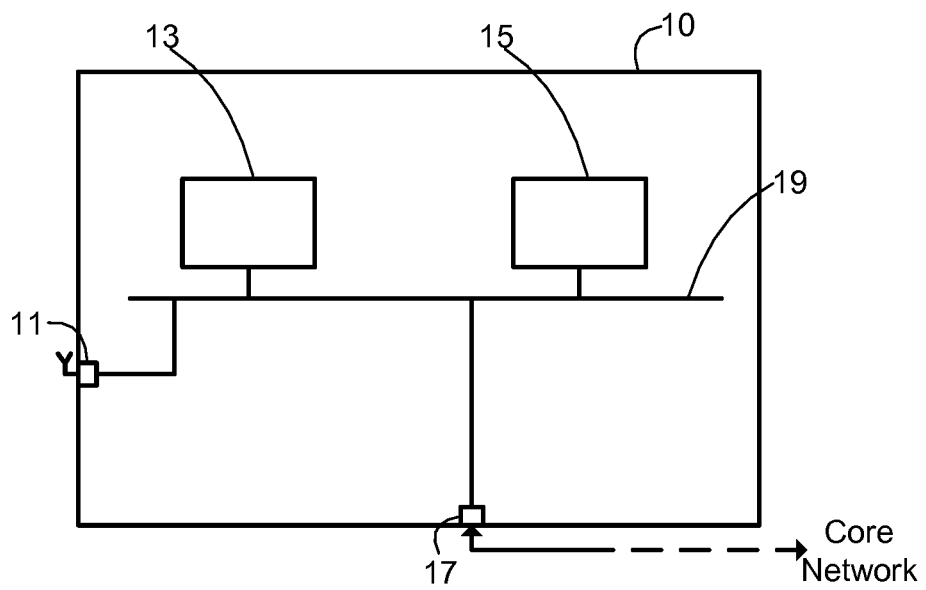
FIG. 2 is a schematic diagram of a first terrestrial base station of the network of FIG. 1.

The first terrestrial base station 10 is shown in more detail in FIG. 2. The first terrestrial base station 10 includes a first transceiver 11, a processor 13, memory 15, and a second transceiver 17, all connected via bus 19. In this embodiment, the first transceiver 11 is an antenna configured for wireless communications via the Long Term Evolution (LTE) protocol, and the second transceiver 17 is an optical fiber connection for wired communications with a core network (not shown) and other base stations of the cellular telecommunications network 1. The first terrestrial base station 10 is configured to use the first transceiver 11 to communicate with a UE of the cellular network 1 (e.g. UE 40) to provide voice and/or data communication services.

The first terrestrial base station 10 stores, in memory 15, a "UE History" database. This data indicates, for each UE that the first terrestrial base station 10 serves, information regarding the first terrestrial base station 10 and up to fifteen prior serving base stations for the UE. This information includes their identifier (e.g. E-UTRAN Cell Global Identifier, eCGI), an approximate size of their coverage areas (e.g. very small, small, medium or large), and the time the UE stayed within its coverage area. As will be explained in more detail in the embodiment of the method of the invention (described below), this information may be used to define the mobility state estimate (i.e. a speed estimate) for the UE.

The second terrestrial base station 20 is substantially the same as the first terrestrial base station 10, such that it may communicate with a UE (e.g. UE 40) using the LTE protocol and with the core network via an optical fiber connection.

Figure 3:
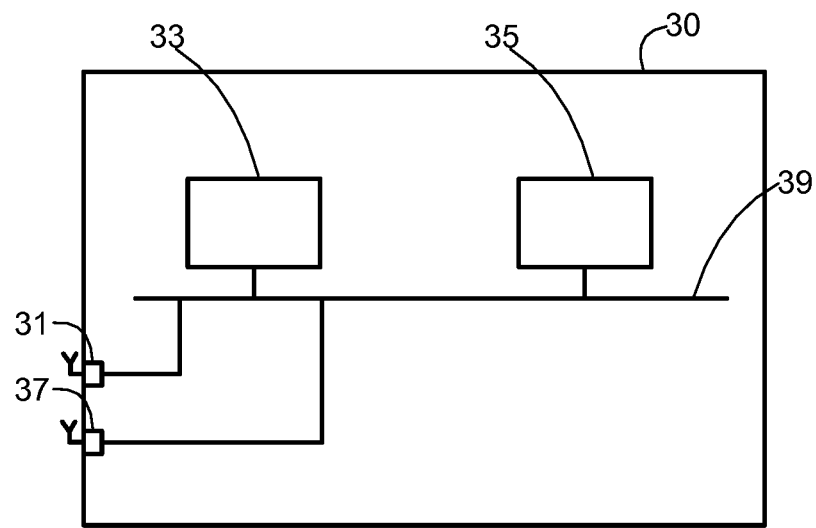
FIG. 3 is a schematic diagram of a mobile base station of the network of FIG. 1.

The mobile base station 30 is shown in more detail in FIG. 3 and is also similar to the first terrestrial base station 10 and includes a first and second transceiver 31, 37, a processor 33 and memory 35, all connected via bus 39. However, the second transceiver 37 is a wireless communications interface for communicating with the core network of the cellular network 1, which, in this embodiment, is via a terrestrial base station. The mobile base station 30 may therefore serve UE 40 via its first transceiver 31, and any data traffic associated with this UE is transmitted between the UE and the core network via the mobile base station 30 and the first or second terrestrial base station 10, 20 (that is, the first or second terrestrial base station 10, 20 may act as a "donor" base station for the mobile base station 30).

In this embodiment, the mobile base station 30 includes a plurality of rotors which allow the mobile base station 30 to generate lift, a plurality of actuators and sensors to control its flight (which operate under the control of an autonomous flight function of the processor 33), and a power supply. Furthermore, the mobile base station 30 includes a Global Navigation Satellite System (GNSS) function, such as a Global Positioning System (GPS) function, in order to determine its position (and time derivatives thereof, such as velocity and acceleration), a compass to determine its bearing, and an altimeter to determine its height.

Figure 4A:
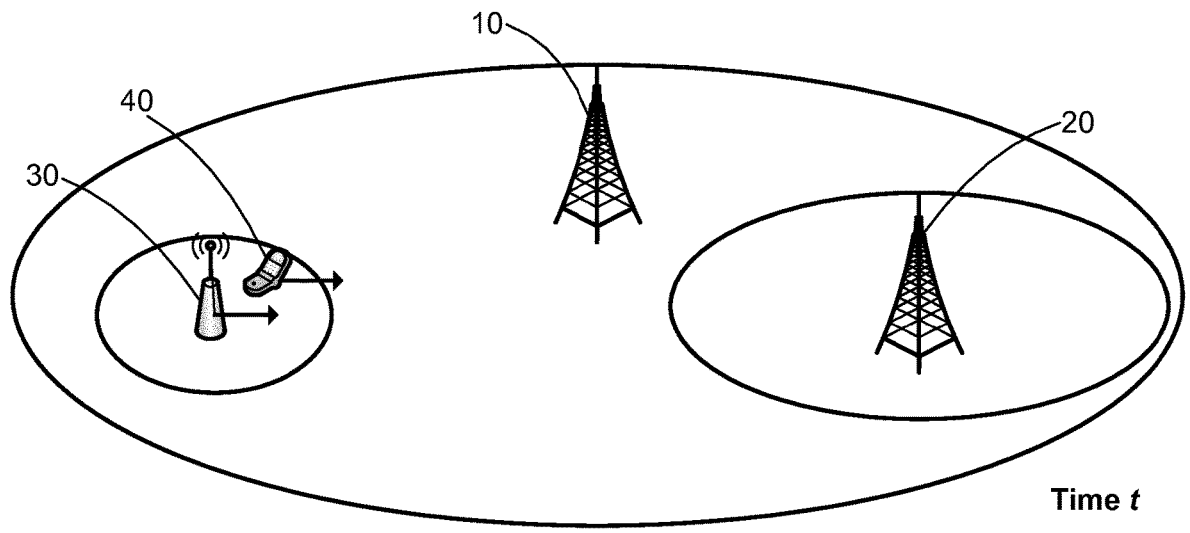
FIGS. 4a to 4c illustrate the mobile base station of FIG. 3 moving relative to a first and second terrestrial base station of the network of FIG. 1.
Figure 4B:
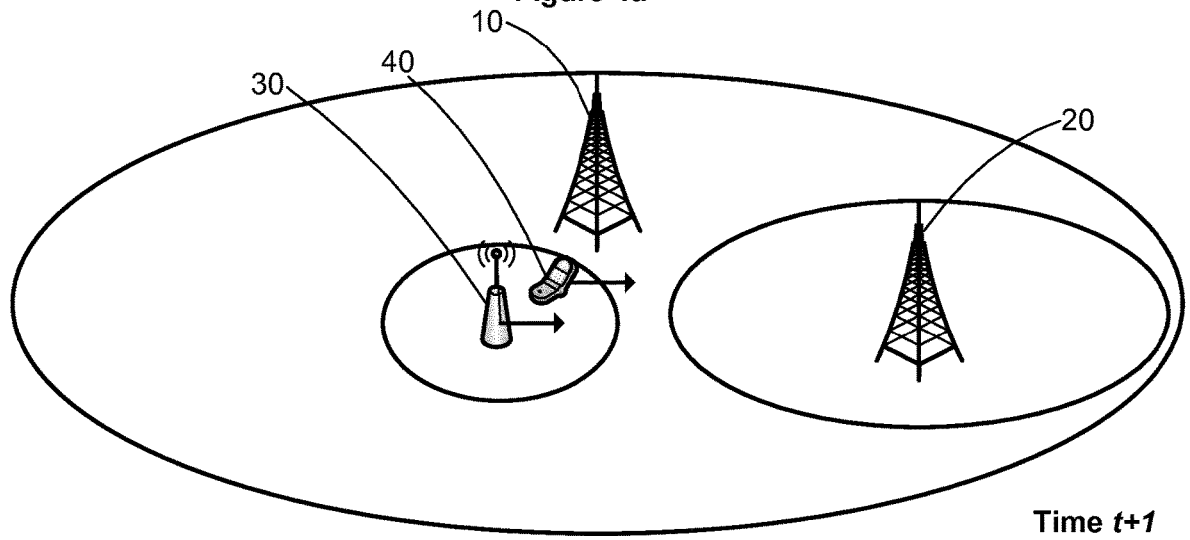
Figure 4C:
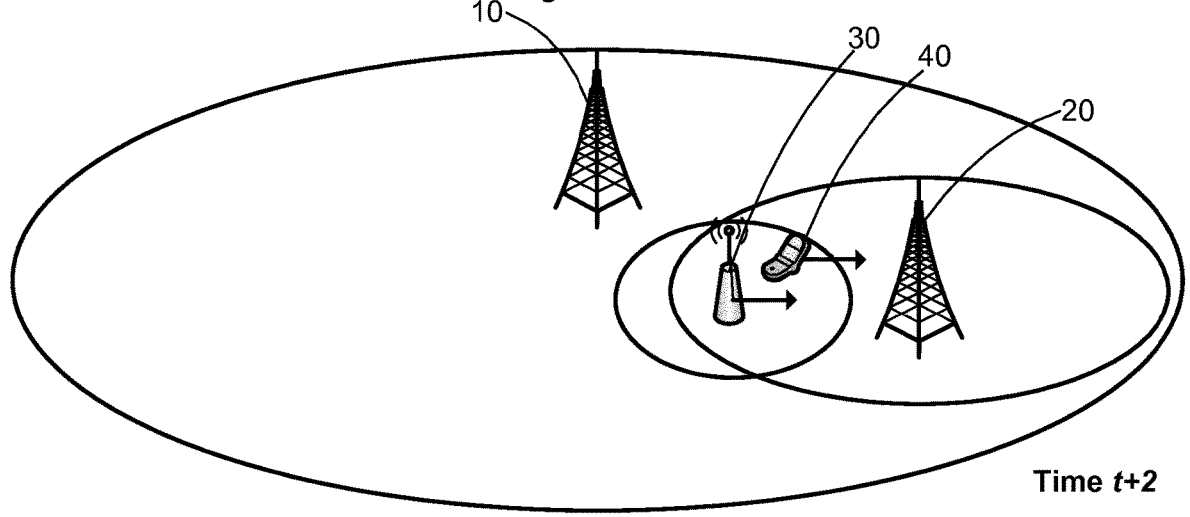

A first embodiment of a method of the present disclosure will now be described with reference to FIGS. 4a, 4b, 4c and FIG. 5. In this embodiment, the mobile base station 30 serves UE 40 and uses the first terrestrial base station 10 as a donor base station. As shown in the diagram of FIG. 4a, the mobile base station 30 is moving at a first velocity (as illustrated by its respective arrow in FIG. 4a), UE 40 is also moving at the first velocity or a velocity substantially the same as the first velocity (as illustrated by its respective arrow in FIG. 4a), and the first and second terrestrial base stations 10, 20 are both stationary. The UE 40 therefore remains substantially stationary relative to the mobile base station 30, whilst the UE 40 and mobile base station 30 are both moving relative to the first and second terrestrial base stations 10, 20. FIGS. 4a, 4b and 4c illustrate the network at times t, t+1 and t+2, showing the progression of the mobile base station 30 and UE 40 towards the position of the second terrestrial base station 20.

Figure 5:
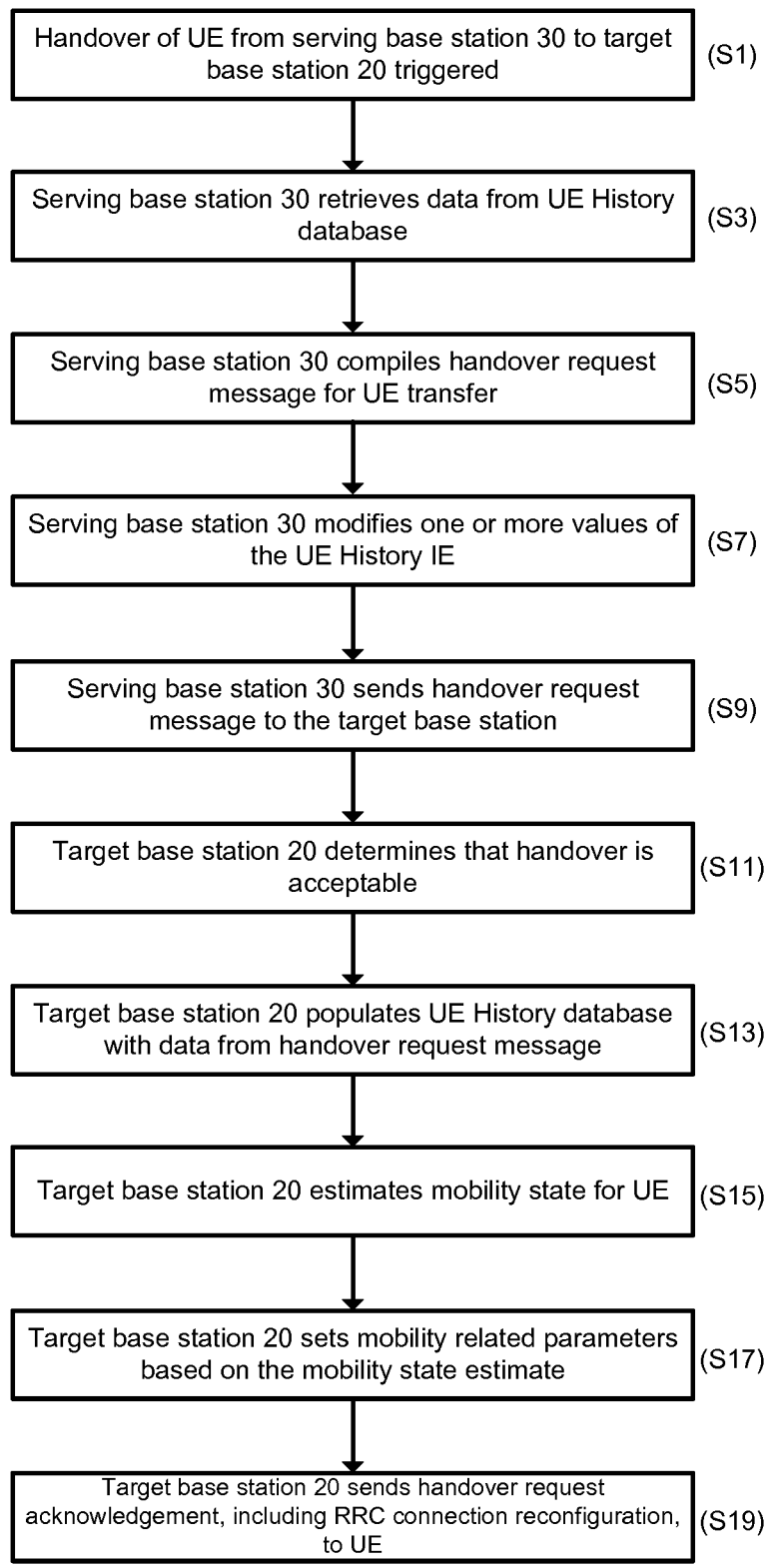
FIG. 5 is a flow diagram of a first embodiment of a method of the present disclosure.

At time t+2, the mobile base station 30 and UE 40 move to a position within the second terrestrial base station's coverage area. In [[step]] 51, as shown in FIG. 5, a condition is met to initiate a handover of the UE 40 from the mobile base station 30 to the second terrestrial base station 20. Accordingly, the mobile base station 30 prepares a handover request message, which, in this embodiment, is prepared according to the following.

In [[step]] S3, the mobile base station 30 retrieves data from its UE History database for UE 40. This data is represented in the following table:

TABLE 1

Table illustrating the UE History for UE 40 stored
in memory of the mobile base station 30

| Previous Serving Base Station | Base Station Information Type | Value |
|---|---|---|
| 1 | Base Station Identifier (eCGI) | $eCGI_1$ |
|   | Size of Base Station's Coverage Area | $Size_1$ |
|   | Time UE Stayed in Base Station's Coverage Area | $Time_1$ |
| 2 | Base Station Identifier (eCGI) | $eCGI_2$ |
|   | Size of Base Station's Coverage Area | $Size_2$ |
|   | Time UE Stayed in Base Station's Coverage Area | $Time_2$ |
| ... | ... | ... |

In [[step]] S5, the mobile base station 30 compiles a handover request message, including a first part including a request that the second terrestrial base station 20 accept a handover for the UE 40 and thereafter provide voice and/or data communication services to the UE 40, and a second part being a UE History Information Element including the UE History information retrieved in [[step]] S3.

In [[step]] S7, the mobile base station 30 modifies one or more values of the UE History Information Element for UE 40. In this embodiment, the mobile base station 30 modifies the value of "Time UE Stayed in Base Station's Coverage Area" to indicate the time period UE 40 would have stayed in the base station's coverage area had the mobile base station 30 been stationary. This is achieved by:

the mobile base station 30 determining its own velocity, $v_{MBS}$, using GPS measurements. This may also be expressed as the mobile base station's relative velocity to a stationary object, $\vec{v}_{MBS\ rel\ SO}$;

the mobile base station 30 determining its relative velocity with the UE 40, $\vec{v}_{MBS\ rel\ UE}$, based on angle of arrival and/or UE location reports; [[and]]

the mobile base station 30 calculating the UE's relative velocity to the stationary object, $\vec{v}_{UE\ rel\ SO}$, as $\vec{v}_{UE\ rel\ SO} = \vec{v}_{MBS\ rel\ SO} + \vec{v}_{MBS\ rel\ UE}$; and the mobile base station 30 calculating the time the UE would have stayed within its coverage area if the mobile base station 30 had been stationary based on the stored value of 'Size of the Base Station's Coverage Area' (=$Size_1$) and the UE's velocity relative to the stationary object, $\vec{v}_{UE\ rel\ SO}$. As the stored value for the size of the base station's coverage area is one of 'very small', 'small', 'medium', or 'large', the base station first translates this stored value into a suitable distance metric (e.g. standardized distance values for each size). The mobile base station 30 then divides this distance by the UE's velocity relative to the stationary object, $\vec{v}_{UE\ rel\ SO}$, to calculate the modified time value.

In [[step]] S9, the mobile base station 30 sends the handover request message to the second terrestrial base station 20. In [[step]] S11, the second terrestrial base station 20 determines that the handover may proceed. In [[step]] S13, the second terrestrial base station 20 populates its respective UE History database with the data in the UE History Information Element from the handover request message, including the modified time value for 'Time UE Stayed in Base Station's Coverage Area' for the mobile base station 30, and, in [[step]] S15, estimates a mobility state of the UE 40 based on this information. As this time value is modified such that it represents the UE's velocity relative to a stationary object, rather than relative to the mobile base station 30, the second terrestrial base station 20 will estimate a mobility state for UE 40 that accurately reflects its velocity relative to the (also stationary) second terrestrial base station 20. In [[step]] S17, the second terrestrial base station 20 sets mobility related parameters, such as the measurement reporting parameters, based on this mobility state estimate. These parameters will now be more appropriate for the UE's velocity relative to the second terrestrial base station 20 than if they had been set according to a mobility state estimated from the original time value, '$Time_1$'. In one example, the second terrestrial base station 20 may set a measurement reporting frequency that is appropriate for a fast moving UE that may move out of its coverage area in a short timeframe whereas, if the mobility state was estimated from the original time value, the measurement frequency may have been set inappropriately low (or even not at all). Alternatively, the second terrestrial base station 20 may use event based measurement reporting, and these events may be set based upon the mobility state estimate.

In [[step]] S19, the target base station 20 sends a handover request acknowledgement message to the UE (via the mobile base station 30). This includes RRC Connection Reconfiguration parameters including (or derived from) the mobility related parameters determined in [[step]] S17.

In the above embodiment, the mobile base station 30 and UE 40 have a velocity in the same direction. However, the skilled person will understand that the method applies equally in other scenarios, such as when the UE 40 is being served by a mobile base station 30 that is travelling in an opposing direction relative to the UE 40. That is, determining the relative velocity between the UE 40 and the mobile base station 30 will take this into account by summing the two relative velocities together (where one value would of course be a negative value due to it being in the opposite direction). This would result in the time value being modified to indicate that the UE would have been in the coverage area of the mobile base station 30 for a greater time had the mobile base station 30 been stationary. The target base station may then interpret the modified UE History Information Element to estimate a mobility state that is more appropriate for a slower moving UE (e.g. "normal") compared to what would have been estimated if the time value had not been modified (e.g. "fast").

In the above example, the UE and mobile base station 30 are moving at the same velocity (e.g. they are both travelling on the same moving vehicle, such as a train), such that it is possible to implement embodiments of the disclosure by only determining velocity in a single axis (indeed, it would be possible to implement the invention using scalar speed alone). The skilled person will also understand that the method above may be expanded to cover scenarios in which the UE and mobile base station 30 are not moving along a single axis only. That is, the method outlined above may be expanded to cover movement in a two-dimensional coordinate system. In this manner, the relative velocity of the UE 40 to a stationary object may be resolved in both axes and the time value may then be modified based on the greater of these two relative velocities.

The skilled person will also understand that the target base station may use additional factors to estimate the mobility state of the UE. That is, if the target base station is itself a mobile base station, then it may estimate the mobility state of the UE using both the relative velocity of the UE to the stationary object, a relative velocity between itself and the UE (e.g. based on the UE location reports), and the size of the target base station's coverage area. It is therefore beneficial for the serving base station to modify the time value based on the relative velocity of the UE to a stationary object, such as the Earth, such that this may be interpreted in any suitable way by the target base station. It is also possible for the serving base station to modify the time value to be indicative of the UE's relative velocity to any reference object, which both the serving and target base stations may calculate their relative velocities to, in order to implement the method of the above embodiment. However, the relative velocity to a stationary object such as the Earth requires fewer processing steps.

In the embodiment above, the serving base station modifies the value of the time the UE stayed within its coverage area. However, the skilled person will understand that the serving base station may also modify the size of its coverage area to realize the same technical benefits. In this manner, the serving base station may convey the relative velocity of the UE and the stationary object by modifying its coverage area to be larger or smaller than it actually is (e.g. "small" to "medium" or "large" to "medium") to indicate that the relative velocity of the UE to the stationary object is greater or less than its velocity relative to the serving base station. However, it is beneficial to modify the time value as there is a limited set of options for the coverage area size and the method loses accuracy.

The above embodiment of the disclosure also has the technical benefit in that the problem of UE's having incorrect mobility state estimates when being transferred from mobile serving base stations is solved in a way which is backwards compatible with existing base stations. That is, by modifying the values indicative of the UE's velocity from a standardized message (e.g. the UE History IE of the handover request message), the serving base station may encourage any target base station to estimate the correct mobility state for the UE.

In the above embodiment, the serving base station 20 had a connection to the core network via a donor connection to another base station. However, this is non-essential, as the serving base station 20 may connect to the core network via any suitable method (e.g. microwave link, Wireless Local Area Network (WLAN), etc.).

There are also further examples of how the serving base station may modify the UE History Information Element to convey the relative velocity of the UE to the stationary object, which will now be described.

Figure 6A:
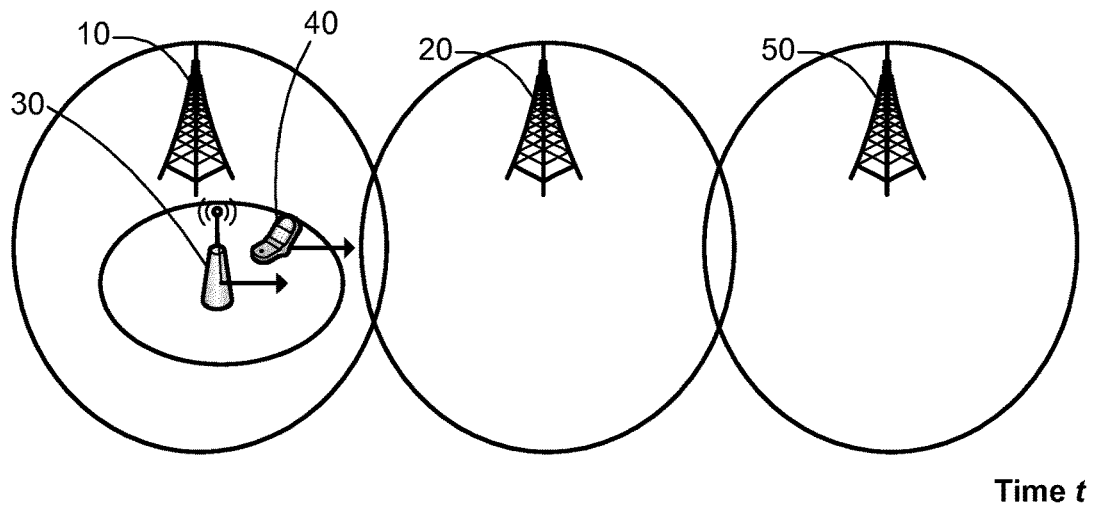
FIGS. 6a to 6c illustrate the mobile base station in a second embodiment of the present disclosure.

A second embodiment of a method of the present disclosure will now be described with reference to FIGS. 6a, 6b, 6c and FIG. 7. In this embodiment, the cellular telecommunications network further includes a third terrestrial base station 50, which, alike the first and second terrestrial base stations, may also act as a donor base station to the mobile base station 30. In this embodiment, the UE 40 is positioned within the coverage area of the mobile base station 30 and is being served by the mobile base station 30. At time t, as shown in FIG. 6a, the mobile base station 30 and UE 40 are both within the coverage area of the first terrestrial base station 10, which acts as a donor base station to the mobile base station 30.

The mobile base station 30 is configured to populate its UE History database with information on the UE's prior serving base stations. However, in this embodiment, the UE History database is modified such that each prior base station that requires a donor connection to the core network (e.g. the mobile base station 30 of this second embodiment) is replaced with information on its one or more donor base stations. Thus, in this example, the UE History includes information on the mobile base station's donor base station (the first terrestrial base station 10) and up to fifteen prior base stations (which either previously served the UE directly or acted as a donor base station to a base station that previously served the UE). The information on the donor base station(s) includes: the donor base station's identifier (eCGI), an approximate size of the donor base station's coverage area (e.g. very small, small, medium or large), and the time the donor base station acted as donor to the mobile base station. This information, as will be detailed in the following description of a method according to this second embodiment, is used in a handover message to encourage the target base station to more accurately estimate the mobility state of the UE. This will now be described.

Figure 6B:
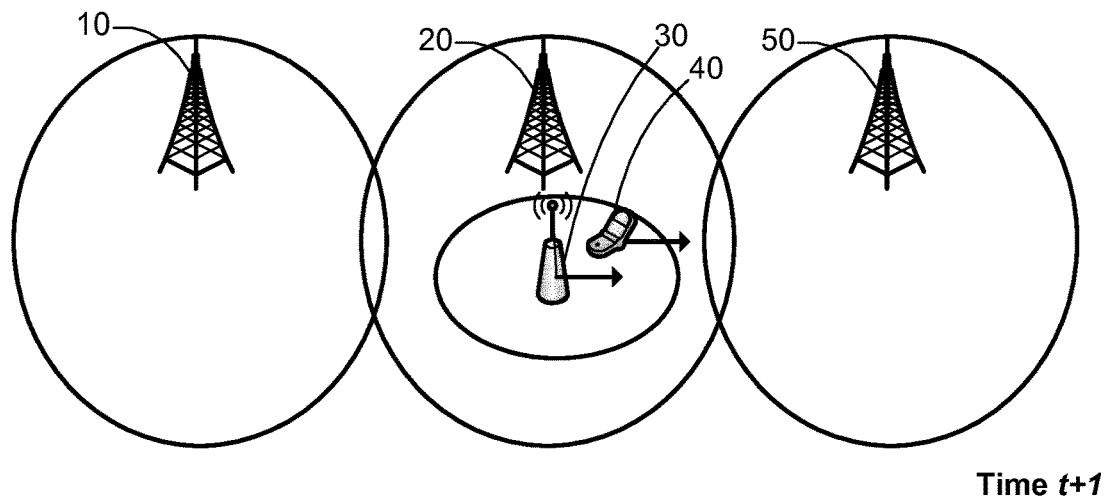

As shown in FIG. 6b, the mobile base station 30 and UE 40 both move from the first terrestrial base station's coverage area to the second terrestrial base station's coverage area at time t+1, and the second terrestrial base station 20 becomes the donor base station for the mobile base station 30. In response to the mobile base station 30 detecting that it is being served by a new donor base station, it updates its UE History database with information on the second terrestrial base station 20 (and the information regarding the first terrestrial base station 10 remains in the database as a prior donor base station).

Figure 6C:
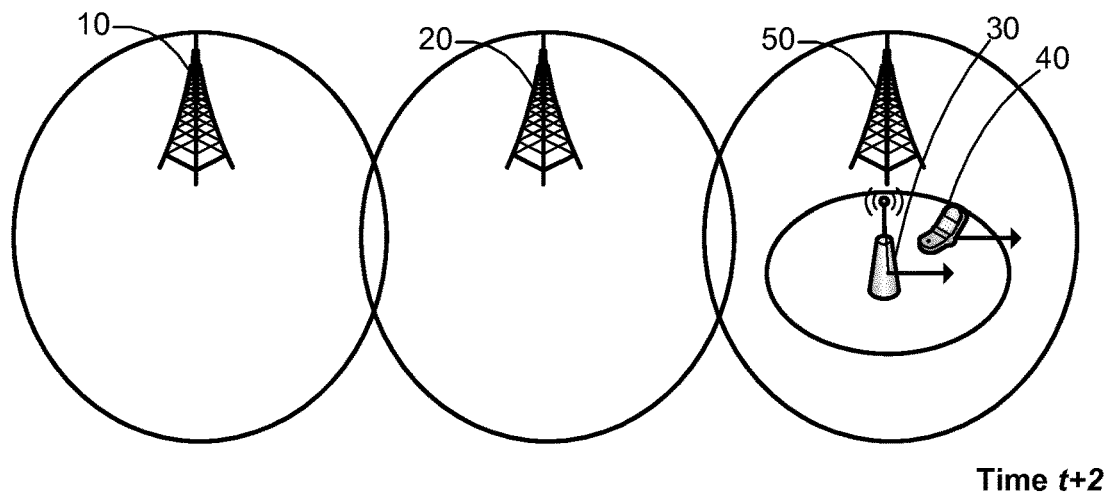
Figure 7:
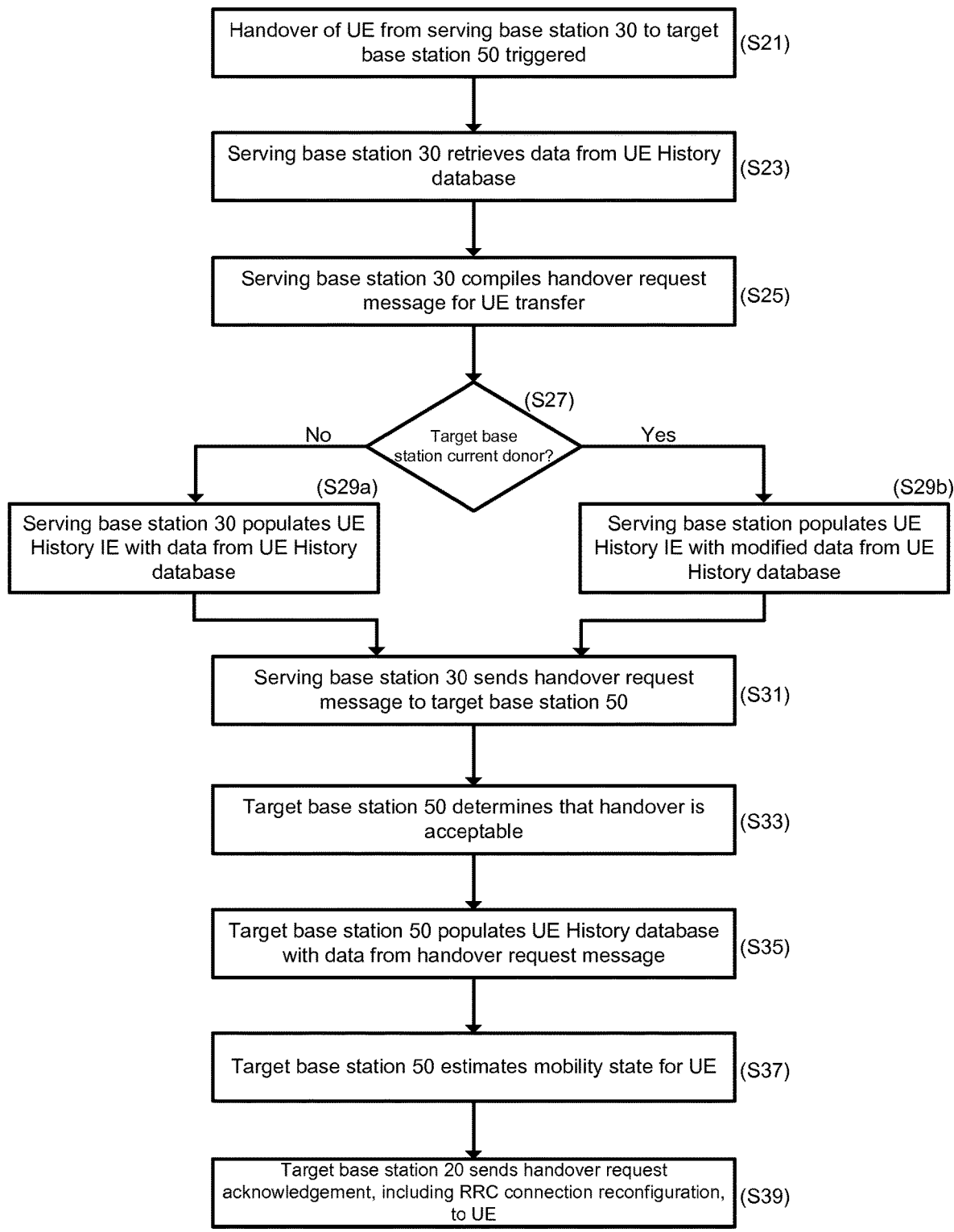
FIG. 7 is a flow diagram of a second embodiment of a method of the present disclosure.

At time t+2, as shown in FIG. 6c, the mobile base station 30 and UE 40 both move from the second terrestrial base station's coverage area to the third terrestrial base station's coverage area, and the third terrestrial base station 50 becomes the donor base station for the mobile base station 30. Again, the mobile base station 30 updates its UE History database with information on the new donor base station, and the information regarding the first and second terrestrial base stations 10, 20 remains in the database. Furthermore, a condition is met such that a handover of the UE 40 from the mobile base station 30 to the third terrestrial base station 50 is triggered ([[step]] S21).

Following this trigger, in [[step]] S23, the mobile base station 30 retrieves, from memory, all entries within the UE History database. As noted above, this includes data on (up to) the last sixteen prior base stations (that previously served the UE directly or acted as a donor base station to a base station that previously served the UE) for the mobile base station 30, including their respective identifiers, their respective sizes, and the time each donor base station served the mobile base station 30.

In [[step]] S25, the mobile base station 30 prepares a handover request message having a first part including a request that the third terrestrial base station 50 accepts a handover of the UE 40 and thereafter provides voice and/or data services to the UE 40, and a second part including a UE History Information Element. In this embodiment, the UE History Information Element is populated using the following process.

In [[step]] S27, the mobile base station 30 determines if the target base station is the current donor base station. If this determination is negative (such that the target base station is not the current donor base station), then the UE History Information Element is populated with this data without any changes ([[step]] S29a). However, in this embodiment, the determination in [[step]] S27 is positive so, in [[step]] S29b, the mobile base station 30 modifies the data for the last donor base station (the third terrestrial base station 50) to use the mobile base station's identifier and the mobile base station's coverage area size (the time value remains the same to represent the time the third terrestrial base station 50 has been the donor for the mobile base station 30).

In [[step]] S31, the mobile base station 30 sends the handover request message to the third terrestrial base station 50. In [[step]] S33, the third terrestrial base station 50 determines that the handover can proceed. In [[step]] S35, the third terrestrial base station 50 populates its respective UE History database with the data in the UE History Information Element from the handover request message, including information on each prior base station, and, in [[step]] S37, estimates the mobility state of the UE 40 based on this data. Accordingly, the UE 40 estimates the mobility state as if the UE had been previously served by the first and second (stationary) base stations 10, 20, rather than the mobile base station 30, using their respective coverage area sizes and the time the UE stayed within their respective coverage areas (based on the time the mobile base station 30 used each base station as a donor). As these two prior donor base stations are stationary, this again conveys the UE's velocity relative to a stationary object such that the target base station may accurately estimate its mobility state. The third terrestrial base station 50 then determines mobility related parameters for the UE 40 based upon this more accurate mobility state. In [[step]] S39, the third terrestrial base station 50 sends a handover request acknowledgement message to the UE (via the mobile base station 30). This includes RRC Connection Reconfiguration parameters including (or derived from) these mobility related parameters.

In the above second embodiment, the mobile base station 30 modifies the entry in the UE History IE with its own data if the most recent donor is the target base station, but the time value remains as the time the target base station has been the donor to the mobile base station. This has the benefit that it forestalls any confusion caused by a future handover in which the UE History IE would otherwise indicate that the third terrestrial base station is the serving base station and is also the immediately preceding serving base station. However, this is not essential. In an alternative scenario, the mobile base station 30 may modify the UE History IE such that the base station identifier includes dummy data.

The skilled person will also understand that the embodiments described above may also be applied in the situation where the UE is in IDLE mode and is being transferred from a mobile base station to another base station under the 'cell reselection' process. In an IDLE mode implementation of the first embodiment of the invention, the UE may determine its velocity itself (that is, its relative velocity with respect to a stationary object), e.g. using GPS. The UE may then estimate its mobility state based upon the number of cell reselections performed in a time period, modified to take into account its actual velocity. That is, the UE calculates the time it would have been positioned within the mobile base station's coverage area had the mobile base station 30 been stationary (e.g. based upon the size of the mobile base station's coverage area and its own velocity), rather than using the actual time it has been positioned within the mobile base station's coverage area, in order to more accurately estimate its mobility state. In an IDLE mode implementation of the second embodiment, the mobile base station 30 may also broadcast information on its donor base station, and the UE may use the donor base station's information rather than the mobile base station's information for its mobility state estimate.

The above embodiments are described for the LTE protocol, in which the UE's speed estimate is known specifically as the mobility state estimate. However, the term "mobility state" covers all forms of UE speed estimates in any cellular communications protocol.

The skilled person will understand that any combination of features is possible within the scope of the invention, as claimed.

The invention claimed is:

1. A method in a cellular telecommunications network having a first base station and a second base station, wherein the first base station is moving relative to the second base station and serves a User Equipment (UE) the method comprising:

the first base station determining a relative speed of the UE with respect to a reference object, wherein the first base station is a mobile base station;

the first base station retrieving data indicating a size of the coverage area of the first base station and further indicating a time the UE has been positioned within the coverage area of the first base station;

setting, by the first base station, one or more of:
a modified time represented by a first information element, the modified time based on the relative speed of the UE with respect to the reference object such that the value for the modified time is different than the time the UE has been positioned within the coverage area of the first base station in the retrieved data, and
a modified size of a coverage area represented by a second information element, the modified size based on the relative speed of the UE with respect to the reference object such that the value for the modified size of the coverage area is different than the size of the coverage area of the first base station in the retrieved data;

the first base station preparing a message to handover the UE to the second base station, the message including the first and/or second information elements that indicate the relative speed of the UE with respect to the reference object, wherein a mobility state for the UE is estimable from the one or more information elements indicating the relative speed of the UE with respect to the reference object;

the first base station initiating a handover of the UE from the first base station to the second base station by sending the message to the second base station, wherein the message includes the first and/or second information elements that indicate the relative speed of the UE with respect to the reference object; and estimating, by the second base station, the mobility state of the UE based upon the one or more information elements to indicate the relative speed of the UE with respect to the reference object.

2. The method as claimed in claim 1, wherein the reference object is stationary.

3. The method as claimed in claim 1, wherein movement of the UE relative to the first base station is such that the UE would have been positioned within the coverage area of the first base station for less time had the first base station been stationary relative to the reference object, and the time value is reduced.

4. The method as claimed in claim 1, wherein movement of the UE relative to the first base station is such that the UE would have been positioned within the coverage area of the first base station for more time had the first base station been stationary relative to the reference object, and the time value is increased.

5. A non-transitory computer-readable storage medium storing a computer program comprising instructions which, when the computer program is executed by a computer, cause the computer to carry out the method of claim 1.

6. A network node for a cellular telecommunications network, the cellular telecommunications network including a base station being adapted for moving relative to a reference object and to serve a User Equipment (UE) the network node comprising a memory and a processor, the processor configured to implement the method of claim 1 wherein the network node is the first base station.

* * * * *

UNITED STATES PATENT AND TRADEMARK OFFICE
CERTIFICATE OF CORRECTION

| | |
|---|---|
| PATENT NO. | : 11,470,533 B2 |
| APPLICATION NO. | : 15/733520 |
| DATED | : October 11, 2022 |
| INVENTOR(S) | : Richard Mackenzie |

It is certified that error appears in the above-identified patent and that said Letters Patent is hereby corrected as shown below:

In the Specification

In Column 1, below Title, insert -- CROSS-REFERENCE TO RELATED APPLICATION
The present application is a National Phase entry of PCT Application No. PCT/EP2019/050677, filed Jan. 11, 2019, which claims priority from EP Patent Application No. 18157844.4, filed Feb. 21, 2018, each of which is hereby fully incorporated herein by reference. --, therefor.

In Column 1, Line 42, delete "last [[16]]" and insert -- last --, therefor.

In Column 2, Line 21, delete "Equipment, UE," and insert -- Equipment (UE) --, therefor.

In Column 4, Lines 1-2, delete "invention" and insert -- disclosure --, therefor.

In Column 4, Line 58, delete "In [[step]]" and insert -- In --, therefor.

In Column 4, Line 58, delete "51," and insert -- S1, --, therefor.

In Column 4, Line 65, delete "In [[step]]" and insert -- In --, therefor.

In Column 5, Line 20, delete "In [[step]]" and insert -- In --, therefor.

In Column 5, Line 26, delete "in [[step]]" and insert -- in --, therefor.

In Column 5, Line 27, delete "In [[step]]" and insert -- In --, therefor.

In Column 5, Line 41, delete "reports; [[and]]" and insert -- reports; --, therefor.

In Column 5, Line 60, delete "In [[step]]" and insert -- In --, therefor.

Signed and Sealed this
Fifth Day of November, 2024

Katherine Kelly Vidal
*Director of the United States Patent and Trademark Office*

CERTIFICATE OF CORRECTION (continued)
U.S. Pat. No. 11,470,533 B2

In Column 5, Line 62, delete "In [[step]]" and insert -- In --, therefor.

In Column 5, Line 63, delete "In [[step]]" and insert -- In --, therefor.

In Column 6, Line 2, delete "in [[step]]" and insert -- in --, therefor.

In Column 6, Line 9, delete "In [[step]]" and insert -- In --, therefor.

In Column 6, Line 25, delete "In [[step]]" and insert -- In --, therefor.

In Column 6, Line 29, delete "in [[step]]" and insert -- in --, therefor.

In Column 6, Line 54, delete "invention" and insert -- disclosure --, therefor.

In Column 8, Line 40, delete "triggered ([[step]]" and insert -- triggered ( --, therefor.

In Column 8, Line 41, delete "in [[step]]" and insert -- in --, therefor.

In Column 8, Line 50, delete "In [[step]]" and insert -- In --, therefor.

In Column 8, Line 58, delete "In [[step]]" and insert -- In --, therefor.

In Column 8, Line 63, delete "changes ([[step]]" and insert -- changes ( --, therefor.

In Column 8, Line 64, delete "in [[step]]" and insert -- in --, therefor.

In Column 8, Line 64, delete "in [[step]]" and insert -- in --, therefor.

In Column 9, Line 4, delete "In [[step]]" and insert -- In --, therefor.

In Column 9, Line 6, delete "In [[step]]" and insert -- In --, therefor.

In Column 9, Line 7, delete "In [[step]]" and insert -- In --, therefor.

In Column 9, Line 12, delete "[[step]] S37," and insert -- S37, --, therefor.

In Column 9, Line 26, delete "In [[step]]" and insert -- In --, therefor.

In Column 9, Line 50, delete "invention" and insert -- disclosure --, therefor.

In Column 10, Line 7, delete "invention" and insert -- disclosure --, therefor.